United States Patent [19]

Ferber et al.

[11] Patent Number: 4,681,444

[45] Date of Patent: Jul. 21, 1987

[54] AUTOMATIC WAVELENGTH CALIBRATION APPARATUS

[75] Inventors: Alan C. Ferber, Hillside, Ill.; Morteza M. Chamran, deceased, late of Elmhurst, Ill., by Delories M. Chamran, legal representative

[73] Assignee: The Perkin-Elmer Corporation, Norwalk, Conn.

[21] Appl. No.: 651,187

[22] Filed: Sep. 14, 1984

[51] Int. Cl.[4] .................. G01N 21/64; G01J 3/10
[52] U.S. Cl. .................... 356/318; 356/326
[58] Field of Search .......... 356/326, 328, 332, 334, 356/317, 318; 250/458.1, 459.1, 461.1, 461.2

[56] References Cited

U.S. PATENT DOCUMENTS 4,203,669 5/1980 Maeda et al. .............. 356/334 X
4,330,207 5/1982 Nogami et al. .............. 356/318

OTHER PUBLICATIONS

Rhinewine, "Simple Wavelength Monitor for a Scanning Spectrometer", Rev. Sci. Instrum., vol. 46, #4, Apr. 1975, pp. 448-450.

Spillman et al, "Computer-Controlled Programmable Monochromator System With Automated Wavelength Calibration & Background Correction", Analytical Chemistry, vol. 48, No. 2, Feb. 1976, pp. 303-311.

Primary Examiner—Vincent P. McGraw
Attorney, Agent, or Firm—Ronald G. Cummings; Francis L. Masselle; Edwin T. Grimes

[57] ABSTRACT

A self-contained automatic computer controlled system for checking and recalibrating the wavelength scale of both monochromators of a fluorescence spectrophotometer is described. No operator adjustments are required. The system sets the wavelength of each monochromator to within 0.1 nanometers. Besides automatic indexing at turn-on the operation can be repeated at any desired time. The system is applicable to single or double monochromator instruments.

28 Claims, 1 Drawing Figure

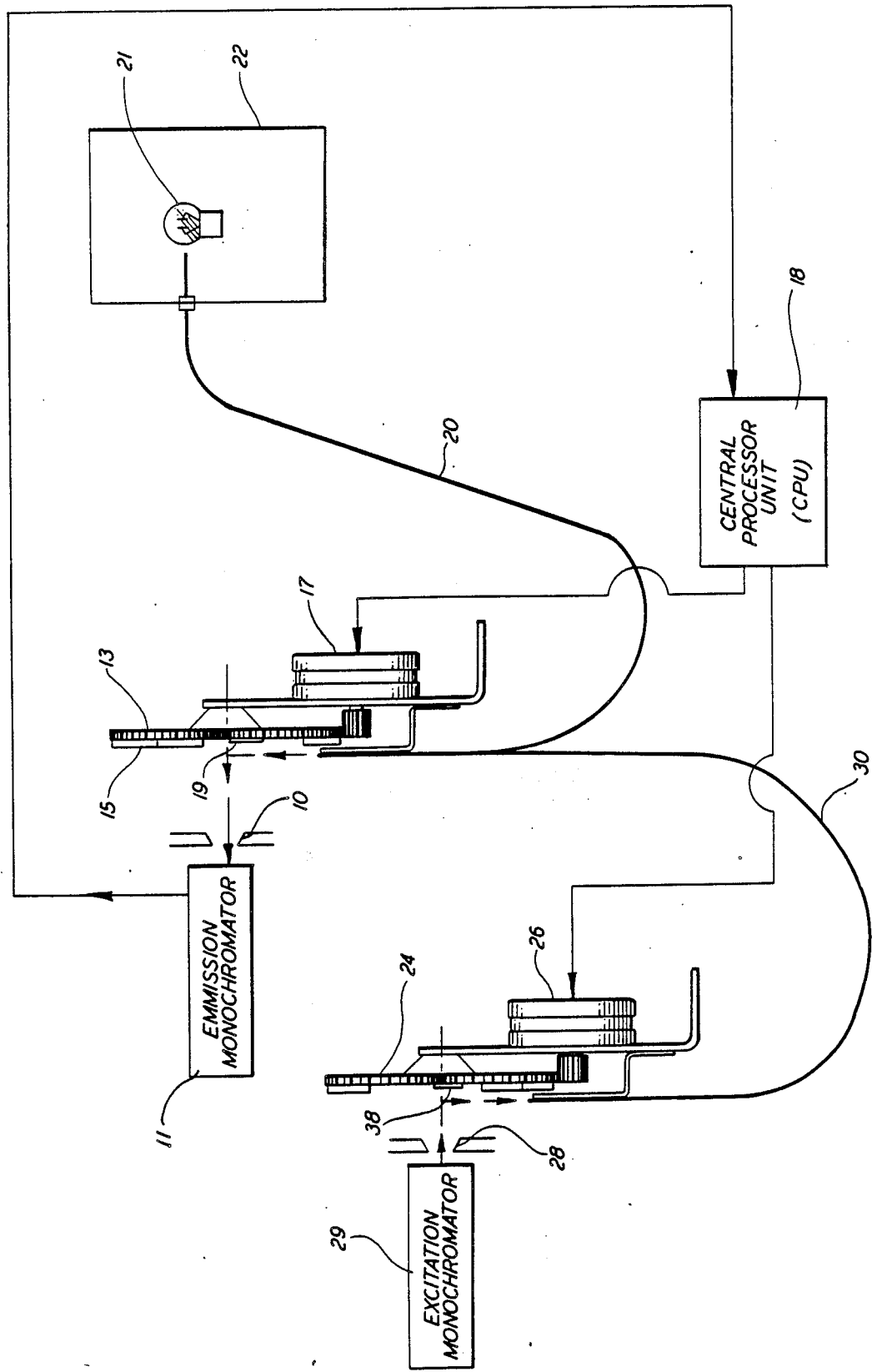

AUTOMATIC WAVELENGTH CALIBRATION APPARATUS

FIELD OF INVENTION

This invention relates to spectrophotometers and, more particularly, to automatic wavelength calibration systems for spectrophotometers.

BACKGROUND OF THE INVENTION

Spectrophotometers having a monochromator to provide light of a known wavelength to the sample are usually precalibrated by mechanical adjustments made during manufacture. However, in precision analytical or research work it is desirable to be able to recheck and, if necessary, to readjust the wavelength scale to correct for mechanical or temperature induced changes. Where two monochromators are involved in a single instrument, such as in a fluorescence spectrophotometer for example, this could be a very time consuming adjustment requiring changes of the light source and the insertion of special samples, filters, etc. for transfer of light from the excitation monochromator to the emission monochromator.

It is an objective of the present invention to provide a build-in wavelength standard with means to couple it to the monochromator for calibration check.

It is a further objective to provide microprocessor controlled means for effecting said wavelength check.

It is a yet further objective to establish by software control an accurate readjustment or indexing of the wavelength.

It is an objective for a fluorescence spectrophotometer to follow up wavelength indexing on one monochromator with software executed indexing of the second monochromator.

It is an accompanying objective to obviate the necessity of operator attachment or removal of any part or appurtenance of the instrument during the recalibration process.

Yet a further objective is to extend said software controlled indexing of wavelength to other reference wavelengths and to double monochromators, where used.

BRIEF DESCRIPTION OF THE INVENTION

In higher performance fluorescence spectrophotometry, the wavelength accuracy and wavelength precision is considered one of the important parameters of the instrument. On the present instruments, wavelength calibration is performed by using emission lines of a known source or absorption bands of a known standard. This type of calibration is usually performed in the factory or by a skilled person and the instrument is expected to maintain that calibration for some time. But, due to mechanical instability or other unavoidable factors, that calibration may change in time, and periodic recalibration may be required.

In the described embodiment, the wavelength calibration is performed when the instrument is turned-on or it can be checked and recalibrated within 0.1 nm whenever the instrument is on. Also, in this system, no operator inserted calibration standard or reflector is required in a sample position, and the user can leave the sample in the cuvette or flow cell in the sample position. To achieve the wavelength calibration automatically and accurately, an inbuilt mercury lamp source is used and calibration is performed at an emission line of this source.

When calibrating, a software program first sets the emission monochromator by directing light from the mercury source into its entrance slit. Then, by monitoring its output the computer locates the wavelength setting corresponding to the peak of the reference mercury line. The value of this setting is stored in memory as index for further settings.

The excitation monochromator is then calibrated by directing light from its exit slit into the emission monochromator. The software then directs the computer to find the wavelength setting where the excitation monochromator agrees with the emission monochromator and to store that setting in memory as index for future wavelength settings.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may readily be utilized as the basis for the designing of other systems for carrying out the several purposes of the invention. It is important, therefore, that this disclosure be regarded as including such equivalent systems as do not depart from the spirit and scope of the invention.

Several embodiments of the invention have been chosen for purposes of illustration and description, and are shown in the accompanying drawings, forming a part of the specification.

BRIEF DESCRIPTION OF THE DRAWING

The FIGURE shows a simplified block-like diagram of the mechanical parts of the calibrating system, according to the invention.

DETAILED DESCRIPTION

In order to provide a fully detailed description of the presently preferred embodiment, the automatic wavelength calibration system of the invention will be described as part of a fluorescence spectrophotometer having an excitation monochromator illuminated by a conventional Xenon arc source and an emission monochromator whose light source is the fluorescence of a cuvette-contained sample excited by the exit beam of the excitation monochromator. Such an arrangement is well known in the art and need not be described in detail except for aspects pertinent to the present invention. Each of these two monochromators is provided with a wavelength drive comprising a stepper motor which receives rotational commonds from a microcomputer in a Central Processor Unite (CPU) of the instrument. The number of steps counted into this motor starting from an initial count stored in computer memory determines the wavelength to which the monochromator is set. Details of the actuating software for such stepper motor wavelength drives are now well known in the filed and need not be described herein. Each of these monochromators is also provided with entrance and exit slits which are positioned with respect to width by further stepper motor drives similarly controlled. Each of these monochromators also has adjacent to one of its slits a rotatable filter assembly driven by a stepper motor similarly controlled. These will be further described hereinafter.

Referring to the drawing the entrance slit 10 of an emission monochromator 11 of the fluorescence spectrophotometer illustrated has mounted adjacent thereto a rotatable disc or wheel 13 having apertures disposed therein at intervals which may be covered with optical filters 15 for stray light control or light attenuation in the usual manner. This filter wheel is rotated to any of several desired positions by a stepper motor 17, as directed by the CPU 18. On the wheel 13 is attached a reflector 19, which may be so positioned that it directs light from a fiber optics cable or light pipe 20 into the entrance slit 10 of the emission monochromator 11.

At the other end of the fiber optics light pipe 20 is mounted a small low pressure mercury lamp 21 contained in a suitable housing 22. This lamp is the reference source for wavelength calibration since it emits light having only a few known specific wavelengths. It is preferred to utilize the 435.84 mercury emission line, but it will be recognized that another line of the available spectrum could alternatively be used. Lines from the Xenon arc spectrum are preferably not used for calibration because they are too broad to give an accurate wavelength reference. Any of several well known small mercury lights such as the Penlite lamp is suitable.

If the calibration procedure being described were to be used to calibrate an absorption spectrophotometer with one monochromator the above described attachments would suffice together with the software routine to be presently described. For a fluorescence spectrophotometer with two monochromators a second similar filter wheel 24 with stepper motor drive 26 is mounted adjacent to the exit slit 28 of the excitation monochromator 29. This second filter wheel has a similar reflector 38 which may be so positioned by the software that it accepts light from the exit slit 28 and directs the light to a second light pipe 30 through which it is conveyed to reflector 19 and directed into the entrance slit 10 of the emission monochromator 11. These added elements make it possible for the wavelength of the excitation monochromator 29 to be calibrated referring to the previously calibrated emission monochromator 11 without the complication of special attachments in the sample carrier or manipulation by the operator.

When the instrument is first turned on, the microcomputer 18 under software control first coarse indexes the excitation and emission monochromators 29 and 11 by driving their wavelength stepper motors to location switch points of the mechanical-optical interrupter position sensors attached to their wavelength drives. This sets the monochromator wavelengths of both monochromators to within about 20 nanometers (nm) of the mercury reference line. The reference mercury lamp is then turned on, the Xenon source shutter is closed, and the emission filter wheel is rotated to the index position. Here, light piped from the mercury lamp 21 via the fiber optics cable 20 is reflected by the small reflector 19 mounted on the emission filter wheel 13 into the entrance slit 10 of the emission monochromator. The entrance slit is widely opened by the computer at this time.

The software routine then causes the microcomputer 18 to scan to the known reference line peak within ±10 nm. Data controlling this scan is provided by the photometric system from the output of the emission monochromator 11. The CPU locates the peak of the line by performing a series of scans. With each successive scan the emission slit widths are reduced to increase the accuracy in locating the reference line. In the final scan the emission monochromator 11 is indexed, i.e. set at that line to an accuracy of better than 0.1 nanometers.

After indexing the emission monochromator 11, the emission monochromator is used to index the excitation monochromator 29. The mercury lamp is turned off and the Xenon lamp shutter opened. The excitation filter wheel 24 located at the exit slit 28 of the excitation monochromator 29 is rotated to its index position. Here the reflector 38 located on the filter wheel 24 gathers light from the opened exit slit 28 of the excitation monochromator 29 and pipes it by another fiber optics cable 30 to the reopened entrance slit 10 of the emission monochromator 11. The microcomputer 18 then scans the excitation wavelength to the calibrated wavelength of the emission monochromator 11 and performs a series of scans of the excitation monochromator 29 to locate the point at which its wavelength equals that of the emission monochromator. This point is reached when the light passing through both monochromators reaches a peak of intensity. Both emission and excitation slits 10 and 28 are set at about 1 nanometers band pass or maybe reduced with successive scans to increase the positional accuracy. In the final scan the excitation monochromator 29 is calibrated and indexed to a precision of 0.1 nanometers.

It will be apparent that both monochromators could be indexed from the mercury source in the same manner, if desired, without departing from the teaching of the invention but at some increase in complexity. Our invention as described herein reduces the calibration complication by the simpler method of using the monochromator already calibrated to calibrate the remaining monochromator.

It will also be apparent that the scope of this invention may be expanded by the addition of suitable similar hardware, viz. reflectors, filter wheels and light pipes plus additional software steps to extend the invention to the calibration of instruments having double excitation and/or emission monochromators. While the automatic calibration herein set forth has been described as happening when the instrument is first turned on, it can also be repeated at any time at the option of the operator by touching a command button or it can be repeated at prescribed intervals or times.

Although certain particular embodiments of the invention are herein disclosed for purposes of explanation, various modifications thereof, after study of this specification, will be apparent to those skilled in the art to which the invention pertains, and reference should accordingly be had to the appended claims in determing the scope of the invention.

What is claimed is:

1. A fluorescence spectrophotometer having an automatic wavelength calibration subassembly comprising,
    a first emission monochromator with inlet and outlet slits and first wavelength drive means,
    an emission line source for emitting a reference line of known wavelength,
    first conducting means for selectively conducting radiation from said line source to the inlet slit of said first monochromator,
    photometric detector means at said outlet slit of said first monochromator,
    a second excitation monochromator with inlet and outlet slits and second wavelength drive means, light source means for excitation of said second monochromator, second conducting means for selectively conducting radiation from said exit slit of said second monochromator to said inlet slit of said first monochromator, computer means for controlling said spectrophotometer having first control means for directing radiation from said line source into said first monochromator and for controlling said first wavelength drive means through a series of scans to center said wavelength drive means at the peak of said reference line to index said first monochromator and second control means for directing excitation radiation from said outlet slit of said second monochromator into said first monochromator and for controlling said second wavelength drive means through a series of scans to center said second wavelength drive means coincident with said index of said first monochromator.

2. The device of claim 1 wherein said line source is integrally mounted within said spectrophotometer.

3. The device of claim 1 wherein said line source is a mercury lamp and said light source is a Xenon arc.

4. The device of claim 1 which comprises first means for selectively varying the width of said entrance and exit slits of said first monochromator and said first control means comprises first means for progressively reducing the width of said slits during said series of scans by said first wavelength drive means.

5. The device of claim 4 wherein said first control means comprises first means for reducing the width of said slits of said first monochromator from a relatively wide slit opening during the initial scan of a series of scans by said first wavelength drive means to a relatively narrow slit opening during the terminal scan of the respective series.

6. The device of claim 1 which comprises first means for selectively varying the width of said entrance and exit slits of said first monochromator and said first control means comprises first means for progressively reducing each successive scan of a series by said first wavelength drive means and for coordinately progressively reducing the width of said slits therewith.

7. The device of claim 1 wherein said first control means comprises first means for progressively reducing the successive scans in a series of scans by said first wavelength drive means to center at the peak of said reference line.

8. The device of claim 1 which comprises means for selectively varying the width of said entrance and exit slits of said second monochromator and said second control means comprises second means for progressively reducing the width of said slits during said series of scans by said second wavelength drive means.

9. The device of claim 8 wherein said second control means comprises second means for reducing the width of said slits of said second monochromator from a relatively wide slit opening during the initiral scan of a series of scans by said second wavelength drive means to a relatively narrow slit opening during the terminal scan of the respective series.

10. The device of claim 1 which comprises second means for selectively varying the width of said entrance and exit slits of said second monochromator and said second control means comprises second means for progressively reducing each successive scan of a series by said second wavelength drive means and for coordinately progressively reducing the width of said slits therewith.

11. The device of claim 1 wherein said second control means comprises second means for progressively reducing the successive scans in a series of scans by said second wavelength drive means to set said second wavelength drive means coincident with said first wavelength drive means.

12. The device of claim 1 wherein said first means for conducting radiation from said line source to said inlet slit comprises an optic fiber assembly extending from said line source to said inlet slit.

13. The device of claim 1 wherein said second means for conducting radiation from said exit slit of said second monochromator to said inlet slit of said first monochromator comprises an optic fiber assembly extending from said second monochromator to said inlet slit.

14. The device of claim 1 which comprises
said first means for conducting radiation from said line source to said inlet slit being an optic fiber assembly having an inlet end at said line source and an outlet end at said first monochromator, and
first selectively operable filter means for filtering radiation entering said inlet slit of said first monochromator, said first filter means having a plurality of filter elements each being selectively positionable adjacent said inlet slit and a selectively positionable first reflector means for alternately reflecting radiation from said outlet end of said first optic fiber assembly to said inlet slit of said first monochromator during wavelength calibration.

15. The device of claim 14 which comprises
said second means for conducting radiation from said second monochromator to said inlet slit of said first monochromator being a second optic fiber assembly having an inlet end at said second monochromator and an outlet end at said first monochromator, and
second selectively operable filter means for filtering radiation exiting said outlet slit of said second monochromator, said second filter means having a plurality of filter elements each being selectively positionable adjacent said outlet slit and a selectively positionable second reflector means for alternately reflecting radiation from said outlet slit of said second monochromator to said inlet end of said second optic filter assembly during wavelength calibration of said second monochromator.

16. An automatic wavelength calibration subassembly in a spectrophotometer comprising a monochromator with inlet and outlet slits and wavelength drive means, an emission line source for emitting a reference line of known wavelength, an optic fiber assembly for selectively conducting radiation from said line source to the inlet slit of said monochromator, selectively operable filter means for filtering radiation entering said inlet slit of said monochromator, said filter means having a plurality of filter elements each being selectively positionable adjacent said inlet slit and a selectively positionable reflector means for alternately reflecting radiation from said outlet end of said optic fiber assembly to said inlet slit of said monochromator during wavelength calibration, photometric detector means at said outlet slit, and computer means for controlling said monochromator including means for controlling said wavelength drive means through a series of scans to center said wavelength drive means at the peak of said reference line to calibrate said monochromator with said reference line.

17. The device of claim 16 which comprises means for selectively varying the width of said entrance and exit slits with said control means comprising means for progressively reducing the width of said slits during said series of scans.

18. The device of claim 17 wherein said control means comprises means for reducing the width of said slits from a relatively wide slit opening during the initial scan of a series of scans to a relatively narrow slit opening during the terminal scan of the respective series.

19. The device of claim 16 which comprise smeans for selectively varying the width of said entrance and exit slits and said control means comprises means for progressively reducing each successive scan of a series and for coordinately progressively reducing the width of said slits therewith.

20. The device of claim 16 wherein said control means comprises means for progressively reducing successive scans in a series of scans to center at the peak of said reference line.

21. The device of claim 16 wherein said means for conducting radiation from said line source to said inlet slit comprises an optic fiber assembly extending from said line source to said inlet slit.

22. The device of claim 16 wherein said emission line source is a mercury lamp integrally mounted within the spectrophotometer.

23. A method of of verifying or recalibrating wavelength in a fluorescence spectrophotometer having a first monochromator with entrance and exit slits and a wavelength drive means, a second excitation monochromator with entrance and exit slits and wavelength drive means, and a light source comprising the steps of
providing a line emission source for emitting a reference line of known wavelength suitable for accurate wavelength calibration integrally mounted to said spectrophotometer for repeatable calibration operations,
occluding the light source from the first monochromator,
conducting radiation from the line emission source to the inlet slit of the first monochromator,
repeatedly scanning the line emission radiation to center the wavelength drive means of the first monochromator at approximately the peak of the reference line of the line emission source for an index setting,
calibrating said first monochromator based upon the index setting of said wavelength drive means of the first monochromator,
occluding radiation from the line emission source and exciting the excitation monochromator with the light source,
conducting radiation from the outlet slit of the excitation monochromator to the inlet slit of said first monochromator, and
repeatedly scanning the light source with said excitation monochromator to center said wavelength drive means of said excitation monochromator at the index setting of said wavelength drive means of said fist monochromator to calibrate said excitation monochromator.

24. The method of claim 23 wherein the steps of scanning the line emission radiation comprises progressively reducing the width of each successive scan in centering the wavelength drive means.

25. The method of claim 23 comprising progressively reducing the width of the inlet and outlet slits of the monochhromator during the step of repeatedly scanning the line emission radiation to increase accuracy in centering the wavelength drive means.

26. The method of claim 23 which comprises progressively reducing the width of each successive scan during scanning of the line emission radiation and correspondingly reducing the width of the inlet and outlet slits of the monochromator.

27. The method of claim 23 wherein the step of conducting radiation from the line emission source to the inlet slit of the monochromator comprises conducting said radiation with a fiber optic assembly.

28. The method of claim 23 comprising the step of opening the width of said entrance slit of said first monochromator prior to repeatedly scanning the light source.

* * * * *